C. AULTMAN.
Harvester Rake.
No. 72,775.
Patented Dec. 31, 1867.
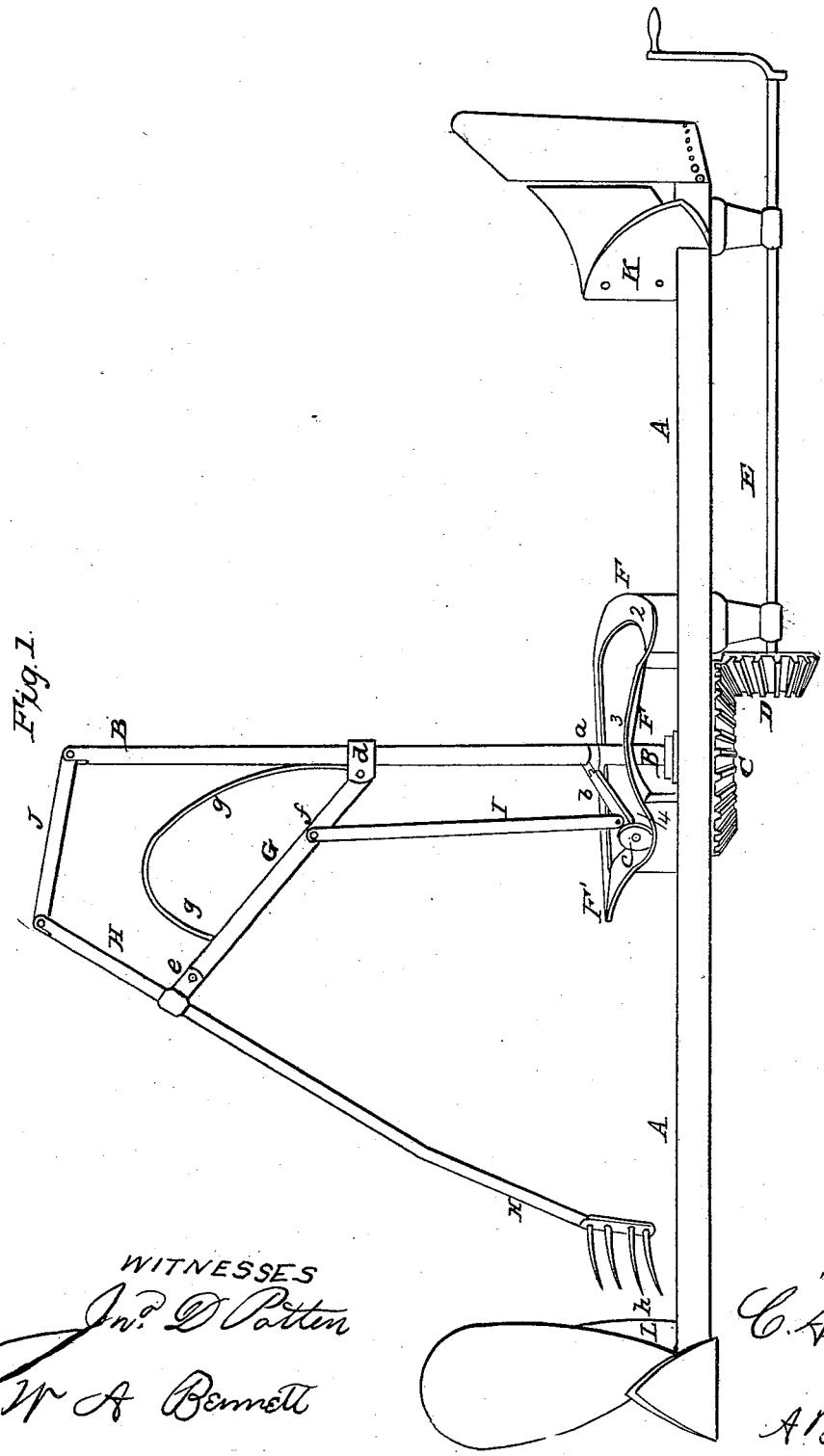

UNITED STATES PATENT OFFICE.

CORNELIUS AULTMAN, OF CANTON, OHIO.

IMPROVEMENT IN HARVESTER-RAKES.

Specification forming part of Letters Patent No. 72,775, dated December 31, 1867.

*To all whom it may concern:*

Be it known that I, CORNELIUS AULTMAN, of Canton, in the county of Stark, and State of Ohio, have invented certain new and useful Improvements in Automatic Rakes for Harvesting-Machines; and I do hereby declare the following to be a full, clear, and exact description of the construction and operation of the same, reference being had to the accompanying drawings, making a part of this specification, in which—

Figure 1 represents an elevation of the rake in question, and so much of a harvesting-machine or its platform as will illustrate its operation in connection therewith.

This invention consists in giving a rake or fork an irregular or elongated sweep over and around the platform, by the combined action of three distinct motions, viz: a continuous rotating, a cam, and a toggle and spring motion, as will be explained.

At the center rear portion of the grain table or platform A is placed an upright post, B, which has on its lower end, underneath the grain-table, a bevel-wheel, C, into which a bevel-pinion, D, on the end of a shaft, E, works, and by which the post B is revolved. The shaft E may receive its motion from the drive-wheels of the harvesting-machine, in a manner well known to mechanicians. Around the base of this post B, but upon the grain-table, is placed a camway, F, having different gradations or "throws" at the points 1 2 3 4 of its surface, for a purpose to be presently explained.

Upon the post B, and at about the plane of the highest point in the cam F, there is secured a projecting piece, *a*, to which an arm, *b*, is hinged, and in the outer end of this arm *b* there is a friction-roller, *c*, that runs upon the top of the camway F. At about the center of the post in height there is another projection, *d*, to which one end of a brace, G, is pivoted, the other end of said brace being similarly pivoted to a projection, *e*, on the rake-stale H. An upright post or brace, I, pivoted to the arm *b*, extends up, and its upper end is pivoted to the brace G at the point *f*, and upon this brace G a spring, *g*, constantly presses, tending to force it downward.

The top of the post B and the top of the rake-stale H are connected by a tie-piece, J, pivoted by one of its ends respectively to each.

The rake-stale has upon its lower end the rake-teeth *h*, for taking and sweeping off the grain from the table.

When the roller *c* is running upon the bevel portion 1 of the camway the rake is moving at the rear of the platform and close to it, it having delivered a gavel, and coming around for another operation. As the roller runs down the steep plane or throw from 1 toward 4 the rake is thrown out close to the outside divider, and when it drops at 4 into the depression there, the rake, as shown in the drawing, is out to its greatest extent. As the roller rises over the swell 3, the rake is drawn in to conform to the front of the platform, and from 3 it runs down again to throw the rake toward the inside divider, thus following all the sides of the platform. From the last depression the roller runs up the cam-plane at 2, and the rake is drawn in nearer to the shaft, and so passes around to 1, for another similar sweeping operation, and thus the rake, moving around with the post B, is projected clear out of a true circular path, and is made to sweep a platform of oblong form and irregular sides or ends. The spring which presses the roller on the camway causes the rake to project quickly at the proper points, while the rising of the roller upon the higher points of the camway draws the rake in toward the post, its center of motion.

Having thus fully described my invention, what I claim therein as new, and desire to secure by Letters Patent, is—

The combination of the rake-stale, linked to a revolving post, with a pivoted arm and roller, that are operated by a camway, and controlled by a spring, for the purpose of giving said rake a motion along or near to the sides and ends of an oblong or irregular-sided platform, in addition to its circular motion, substantially as described.

C. AULTMAN.

Witnesses:
D. TOUNER,
HENRY C. FOGLE.